T. A. EDISON.

SWAGING MACHINE.

APPLICATION FILED NOV. 22, 1919.

Reissued Feb. 3, 1920.

14,798.

Witnesses:

N. L. Fisher

William A. Hardy

Inventor:

Thomas A. Edison by Dyer and Holden his Attys.

UNITED STATES PATENT OFFICE.

THOMAS A. EDISON, OF WEST ORANGE, NEW JERSEY, ASSIGNOR TO NEW JERSEY PATENT COMPANY, OF WEST ORANGE, NEW JERSEY, A CORPORATION OF NEW JERSEY.

SWAGING-MACHINE.

14,798. Specification of Reissued Letters Patent. Reissued Feb. 3, 1920.

Original No. 1,292,277, dated January 21, 1919, Serial No. 177,632, filed June 29, 1917. Application for reissue filed November 22, 1919. Serial No. 339,969.

*To all whom it may concern:*

Be it known that I, THOMAS A. EDISON, a citizen of the United States, and a resident of West Orange, Essex county, New Jersey, have invented certain new and useful Improvements in Swaging-Machines, of which the following is a description.

My invention relates to swaging machines and more particularly to an improved apparatus for fastening an article, such as a diamond splint, within a holder or mounting therefor.

Considerable difficulty has heretofore been experienced in the manufacture of styli for reproducing phonograph records, in so securing the diamond splint or other stylus within the holder therefor that the same will not work loose, and the principal object of my invention is to provide a simple and comparatively inexpensive machine whereby this objection will be obviated and whereby the fastening of the diamond splint or other stylus within its holder may be quickly, effectively and economically accomplished. It is to be understood, of course, that my improved machine is not limited to this use, as the same is adapted to effectively operate on other work.

In its preferred form, the machine comprises means for effecting the heating of the work, preferably by an electric heating current, so as to soften the same, and means for swaging the heated and softened work. In the case of phonograph styli, the holder of the stylus is first heated and softened and is then swaged so as to force the material of the holder about and into close engagement with the stylus so that the latter will be securely and permanently fastened within the holder.

Other objects and features of my invention reside in the construction and combination of parts hereinafter more fully described and claimed.

In order that my invention may be more clearly understood, attention is directed to the drawing accompanying and forming part of this specification, in which corresponding parts are designated by the same reference characters, and in which:—

Figure 4:
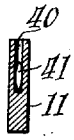
Fig. 4 is an enlarged longitudinal sectional view of a phonograph stylus holder with a diamond splint or other stylus mounted therein, before the holder is subjected to the action of my machine.
Figure 5:
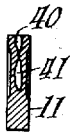
Fig. 5 is a view similar to Fig. 3 showing the holder and stylus after the holder has been heated and swaged.

Referring to the drawing, reference character 1 represents the frame or standard of my improved machine, this frame preferably being made of cast iron and comprising two spaced legs 2 connected at the top by an integrally formed cross piece 3. The standard 1 is preferably secured, as by means of bolts 4 passing through the lower flanged ends of legs 2, to a wooden table or bench 5. A vertical rod 6 is slidably or reciprocably mounted in the frame or standard 1, this rod extending through openings in the top cross piece 3 and the top of the table or bench 5. The lower end of the rod 6 is pivotally connected, as by means of a link 7, to a foot treadle 8 pivoted at one end 9 to a fixed support, such as the floor. The rod 6 constitutes a work holder, the upper end portion thereof being formed with an enlargement 12 provided with an axially extending socket member 10. When the machine is to be used for fastening phonograph styli in their holders, the socket member 10 is preferably provided with a vertical cylindrical recess, the bottom of which is located only a small distance below the upper end of rod 6, so that when a cylindrical stylus mounting or holder, such as shown at 11 in Figs. 4 and 5, is disposed therein, a considerable portion of the holder extends above the rod 6. The upper enlarged portion 12 of rod 6 is formed with a plurality of radially disposed equi-spaced slots 13. Four such slots 13 are shown in the construction illustrated, the adjacent slots being disposed at angles of ninety degrees with respect to each other. Bell crank levers 14 are respectively mounted in the slots 13 for pivotal movement about horizontal axes, as by means of pins 15. The upper horizontal arm of each of the bell crank levers is bifurcated and has removably mounted in the bifurcation 16 thereof, as by means of screws 17, a hardened steel swaging member 18. The inner end of each of the swaging members 18 is beveled to provide the same with a narrow vertical swaging surface 19. The lower vertical arms of the bell crank levers 14 are respectively provided with rolls 20 rotatably mounted on pins 21 secured to the lower end of the bell crank levers. A member 22, preferably in the shape of the frustum of a cone, is mounted on the top of the cross piece 3 and is secured thereto as by means of a centrally disposed and downwardly extending boss 23, preferably integrally formed therewith, which fits tightly within the opening in the cross piece 3 through which the rod 6 extends. The member 22 is provided with a central vertical passageway or opening through which the rod 6 extends. A spiral spring 24 surrounds the rod 6 between the top of the member 22 and the enlarged upper portion 12 of the rod, and constantly tends to hold the rod elevated in the position shown in Fig. 1, the upward movement of the rod being limited by means of a collar 25 secured thereto engaging the lower surface of the cross piece 3 of standard 1.

Figure 2:
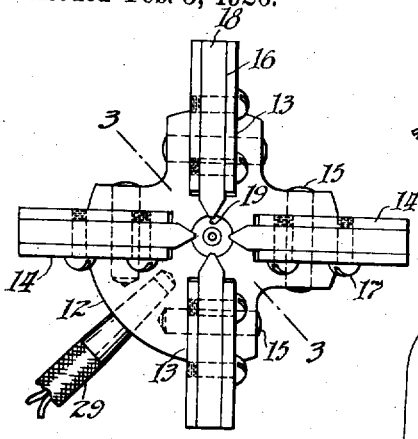
Fig. 2 is an enlarged plan view of the work support and swaging members of the machine shown in Fig. 1.
Figure 3:
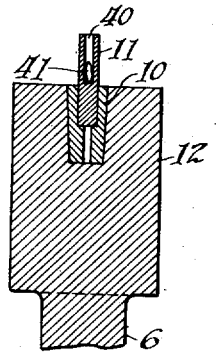
Fig. 3 is a detailed sectional view on line 3—3 of Fig. 2.
Figure 1:
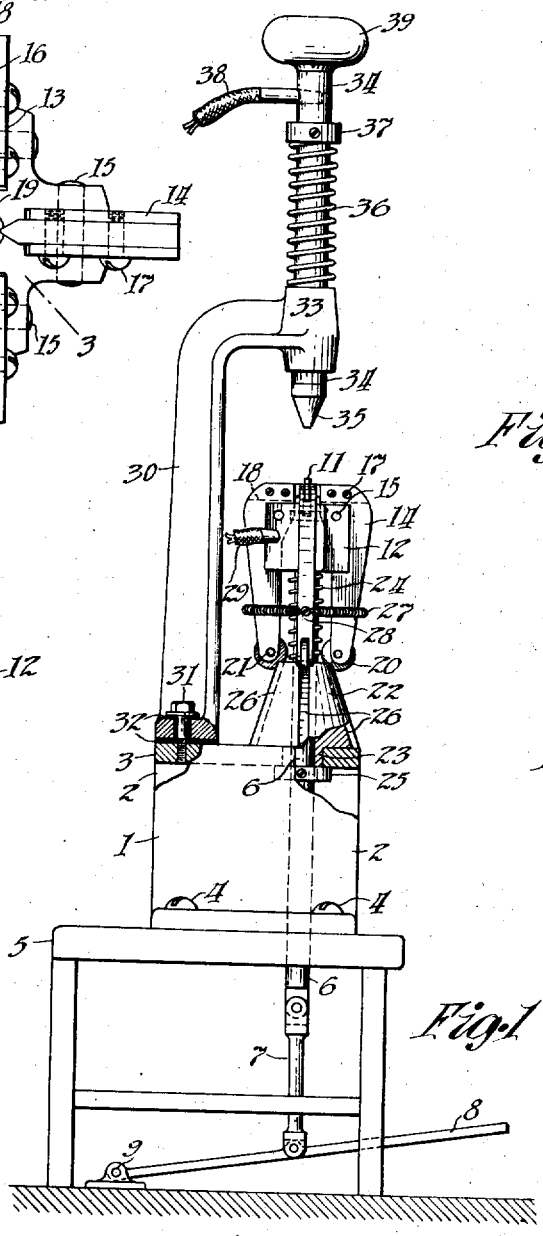
Figure 1 is a view in side elevation, partly in section and partly broken away, of a machine embodying my invention.

The member 22 is provided with four vertically extending grooves 26 which form guideways or tracks for the rolls 20 respectively. When the rod 6 is in its elevated position, as shown in Fig. 1, the rolls 20 are disposed in the upper end portions of grooves 26. The lower vertical arms of the bell crank levers 14 are embraced by a coiled spring 27, which is held in place on said levers as by means of one or more screws 28 Reference character 29 represents an insulated conductor plugged into the enlarged upper end portion 12 of the rod 6 and connected to one side of an electric heating circuit.

Reference character 30 represents a vertically extending bracket secured at its lower end to the cross piece 3 of the standard 1, as by means of one or more bolts 31. The bracket 30 is suitably insulated from the standard 1 as by means of insulation 32, and the upper end thereof is provided with a bearing protion 33 in vertical alinement with the rod 6. A cylindrical rod 34 of conducting material, preferably copper, is slidably disposed in the bearing portion 33 and is formed at its lower end portion with a conical portion 35, the lower end of which conical portion is adapted to engage and coact with the stylus mounting or other work supported in the upper end portion of rod 6 for a purpose to be hereinafter described. A coiled compression spring surrounding the rod 34 and disposed between a collar 37 secured to the rod and the upper end of the bearing portion 33, constantly tends to maintain the rod 34 in the elevated position shown in Fig. 1. An insulating conductor 38 is plugged into the rod 34 and is connected to the other side of the heating circuit. The upper end of rod 34 is provided with a knob or handle 39 whereby the rod may be manually depressed against the action of spring 36.

The operation of my swaging machine is as follows:—The work to be acted upon is first placed in the socket 10. In the drawing this work is shown as a cylindrical stylus holder or mounting 11 having an axially extending recess 40 in which a diamond splint 41 is loosely mounted. It will be seen that all that portion of stylus mounting 11 in which the recess 40 is formed projects above the rod 6. The copper rod 34 is now depressed against the action of spring 36 until the lower end of the conical portion 35 thereof engages the stylus mounting 11 or other work supported in the upper end portion of rod 6. This closes the electric heating circuit through the stylus mounting or other work, and quickly brings the latter up to a red and almost white heat and thereby renders the same soft. Pressure on the knob 39 is then removed, whereupon the spring 36 acts to elevate the rod 34 to the position shown in Fig. 1 to thereby break the electric heating circuit. The foot treadle 8 is then immediately depressed, thereby pulling the rod 6 down against the action of springs 24 and 27. In the downward movement of the rod 6, the lower vertical arms of the bell crank levers 14 are forced outwardly by the action of the inclined bottoms of the grooves 26 in the member 22 on rolls 20, and the upper horizontal arms of the bell crank levers 14 are accordingly moved inwardly toward the portion of the work or stylus mounting 11 which projects above the rod 6. The inward movement of the upper horizontal arms of the bell crank levers 14 brings the flat vertical swaging surfaces 19 of the swaging members 18 into engagement with the highly heated and softened mounting or holder 11 and thereby forces the material thereof about and into close engagement with the diamond splint or stylus 41, as shown in Fig. 5. Upon removing the pressure from the foot treadle 8, the springs 24 and 27 act to quickly return the rod 6 to the raised or elevated position shown in Fig. 1. It will be obvious that spring 27 constitutes unitary means tending to move the levers 14 and thereby the swaging members 18 to inoperative position and to maintain rod 6 in its elevated position, and that if this spring is made sufficiently strong, the coiled spring 24 may be omitted. I prefer, however, to employ both of the springs 24 and 27.

The machine above described has been found to be very efficient in operation and is very easy to manipulate. This machine also has a high capacity, as it takes but a few seconds to heat and swage a stylus mounting as described above.

While I have illustrated the preferred form of my improved machine, it is to be understood that the same is subject to various changes and modifications without any departure from the spirit of my invention and the scope of the appended claims.

Having now described my invention, what I claim as new and desire to protect by Letters Patent is as follows:

1. In a machine of the class described, a movably mounted work support, means for effecting the heating of work carried by said support, and a device for automatically effecting the swaging of said work by the movement of said support away from said means, substantially as described.

2. In a machine of the class described, a movably mounted work support, and means movable with said support for automatically subjecting work carried by said support to a swaging action by the movement of said support, substantially as described.

3. In a machine of the class described, a work support, means operable to effect the heating of work carried by said support, and means operable independently of said last means to effect the swaging of said work, substantially as described.

4. In a machine of the class described, a work support, means operable to effect the passage of an electric heating current through work carried by said support, and means operable independently of said last means to effect the swaging of said work, substantially as described.

5. In a machine of the class described, a work support, means coöperative with the said support and operable to effect the heating of work carried by the support, and means operable independently of said last means and comprising relatively movable devices adapted by their relative movement to effect the swaging of the work carried by the support, substantially as described.

6. In a machine of the class described, a work support, one or more members movable to effect the swaging of work carried by the support, a device between which and the work support there is a relative movement, relative movement of said support and device being adapted to effect operative movement of said swaging members, and unitary means constantly tending to hold said swaging members in inoperative position and said support and device in a given relative position, substantially as described.

7. In a machine of the class described, a work support, a device between which and the work support there is a relative movement, and one or more members movable relatively to said support for swaging work carried by the latter, said device being adapted to automatically effect the operation of said members upon relative movement of said support and device, substantially as described.

8. In a machine of the class described, a work support, a device between which and the work support there is a relative movement, one or more members movable relatively to said support for swaging work carried thereby, said device being adapted to automatically effect the operation of said members upon relative movement of said support and device in one direction, and means constantly tending to effect relative movement of said support and device in the opposite direction, substantially as described.

9. In a machine of the class described, a work support, a device between which and the work support there is a relative movement, one or more members movable relatively to said support for swaging work carried thereby, said device being adapted to automatically effect the operation of said members upon relative movement of said support and device in one direction, and unitary means constantly tending to effect relative movement of said support and device in the opposite direction and to render said members inoperative, substantially as described.

10. In a machine of the class described, a work support, a device between which and the work support there is a relative movement, swaging members mounted on said support to move toward the work carried by the latter, said device being adapted to effect such movement of said members upon relative movement of said support and device in one direction, and means constantly tending to effect relative movement of such support and device in the opposite direction, substantially as described.

11. In a machine of the class described, a work support, a device between which and the work support there is a relative movement in a direction axially of said support, and one or more levers, each lever being pivoted to said support and having one arm provided with a swaging device and movable toward and away from work carried by the support by pivotal movement of the lever, said device having an inclined surface coacting with the other arm of the lever to automatically effect pivotal movement of the lever by relative movement of said support and device, substantially as described.

12. In a device of the class described, a work support connected to one side of a heating circuit, a movably mounted contact member connected to the other side of the circuit and biased to a position spaced from said support, said member being movable toward the work support to close said circuit through work carried by said support, said support being movable away from said member, and means whereby the movement of said support away from said member automatically effects the swaging of the work carried thereby, substantially as described.

13. In a machine of the class described, a movably mounted work support, means for effecting the heating of work carried by said support, and a device separate from said means for automatically effecting the swaging of said work by the movement of said support in one direction, substantially as described.

14. In a machine of the class described, a movably mounted work support biased to a predetermined position, and means automatically brought into engagement with and subjecting the work carried by said support to a swaging action by the movement of said support away from said position, substantially as described.

15. In a machine of the class described, means for effecting the heating of work in the machine, and means for effecting the swaging of said work by relative movement of the work and heating means away from each other, substantially as described.

16. In a machine of the class described, means for effecting the heating of work in the machine, and means for effecting the swaging of said work by movement of the latter bodily in one direction, substantially as described.

17. In a machine of the class described, means tending to maintain work mounted in the machine in a predetermined position, and means subjecting said work to a swaging action upon movement of the work away from said position, substantially as described.

18. In a machine of the class described, a work support, means for effecting the heating of work carried by said support and between which and the work support there is relative movement, and means for effecting the swaging of said work by relative movement of the work support and heating means away from each other, substantially as described.

This specification signed this 25th day of July 1919.

THOS A. EDISON.